(12) United States Patent
Ulrich

(10) Patent No.: US 7,324,934 B2
(45) Date of Patent: Jan. 29, 2008

(54) FEEDBACK PROCESS TO MODEL CP UTILIZATION IN MULTI-PROCESSOR PERFORMANCE MODELS

(75) Inventor: Hanno Ulrich, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 642 days.

(21) Appl. No.: 10/602,116

(22) Filed: Jun. 23, 2003

(65) Prior Publication Data

US 2004/0002839 A1    Jan. 1, 2004

(30) Foreign Application Priority Data

Jun. 29, 2002    (EP) .................................. 02014506

(51) Int. Cl.
G06F 9/45      (2006.01)
G06F 17/50     (2006.01)
G05B 13/02     (2006.01)

(52) U.S. Cl. ............................... 703/22; 703/2; 703/13; 700/29; 700/30

(58) Field of Classification Search .................. 703/2, 703/13, 22; 700/2, 29, 30
See application file for complete search history.

(56) References Cited

OTHER PUBLICATIONS

Menascé, D.A. et al. Capacity Planning and Performance Modeling. © 1994. pp.iii-ix, 113-129, 153-159, and 263-266.*
Färber, G. et al. "Improving Processor Utilization with a Task Classification Model Based Application Specific Hard Real-Time Architecture." Proc. 4th Int'l Workshop on Real-Time Computing Systems and Applications. Oct. 27-29, 1997. pp. 276-283.*
Lauzac, S. et al. "An Efficient RMS Admission Control and its Application to Multiprocessor Scheduling." Proc. of the 1st Merged Int'l . . . and Symposium on Parallel and Distributed Processing. Mar. 30-Apr. 3, 1998. pp. 511-518.*

* cited by examiner

Primary Examiner—Paul Rodriguez
Assistant Examiner—Ayal I. Sharon
(74) Attorney, Agent, or Firm—John E. Campbell; Floyd A. Gonzalez

(57) ABSTRACT

Feedback control algorithms for controlling a given simulation model which relates to a computer-program-based method and respective system for providing a feedback control for a given set of control quantities of a simulation model, comprising a plurality of iterated simulation runs each of which consumes a considerable amount of time. Each single run is performed with a setting of starting values for certain entry control quantities suited to control certain target quantities. The respective next setting of entry quantities is based on the value of the target quantities measured in the preceding simulation run. In order to provide for a fast convergence of the target quantities to a final, predetermined value, the following formula is applied:

$$x'_{n+1} = \frac{v_n}{1 + \rho_n(1 - v_n)}$$

where $v_n = (n+1)u - nu_n$ u is the final value of the target control quantity aimed at $u_n$, its value achieved up to iteration n of the simulation run and $\rho_n$ is a suitable system parameter. $\chi$ is a certain entry quantity suited to make $u_n$ converge against u, and $\chi'_{n+1}$ is the value of $\chi$ to be chosen for the next iteration.

3 Claims, 5 Drawing Sheets

FEEDBACK PROCESS TO MODEL CP UTILIZATION IN MULTI-PROCESSOR PERFORMANCE MODELS

BACKGROUND OF THE INVENTION

The present invention relates to a method and system implementing feedback algorithms for controlling a given simulation model. In particular, it relates to a computer-program-based method and system for providing a feedback control for a given set of control quantities of a simulation model, comprising a plurality of iterated simulation runs in which a single simulation run consumes a considerable amount of time.

The present invention will be next defined from prior art on the specific field of computer system modeling. In particular, the invention will be illustrated by an exemplary application to a large scale multi-processor (MP) performance model with special focus on storage hierarchy (SH) performance.

In the inventive context the term model refers to a time-dependent simulation model in contrast to an analytical spread sheet model: Simulation models are true cycle-by-cycle models of computer systems. In particular, queuing delays and resource utilizations are a result of simulated data transfer. Analytical models instead use mathematical formula to calculate queuing delays from given rates and utilizations.

In large-scale compute environments, it is generally recommended that central processor (CP) utilization should not exceed 90%. Otherwise, excessive queuing delays for shared system resources can severely impact system performance. Therefore, performance benchmarks used to test real hardware are also usually performed at the same CP utilization of 90%.

Consequently, simulation models of real hardware must be able to accurately simulate any given CP utilization. When a multi-processor model ignores CP utilization and hence runs at a utilization of 100% instead of 90%, the load on the storage hierarchy cooperating closely with said CPs is significantly overstated and not representative for real customer environments. Sample model runs ignoring CP utilization turned out to mispredict total system capacity by as much as 7.5%. A misprediction of that magnitude can lead to wrong and hence costly design decisions and—even worse—to a wrong positioning in the marketplace.

The difficulty to correctly model a given CP utilization results from the fact that CP busy time and hence CP utilization includes both pure instruction processing time and the time in which the CP is waiting for storage hierarchy (SH) requests to be resolved. The wait time in turn depends on the load of the SH and thus indirectly on CP utilization. As this functional relationship is unknown, prior art computer simulation models often ignore CP utilization completely and operate constantly at a utilization of 100%—with the exposures and consequences as mentioned above.

The inventive approach presented here applies both to computer system models driven by instruction traces and driven by event rates.

In models driven by instruction traces, the simulated CPs read, interpret and execute instruction sequences. In this case, CP utilization can be simulated by suspending instruction processing for a while at adequate points in the instruction stream—that is by artificially inserting periods of user think time. Event driven models instead have drivers implemented which statistically generate requests to the storage hierarchy. Typical requests are L1 cache misses. Their frequency is an input parameter to the model and CP utilization is reflected in the interarrival time of events which is the average number of processor cycles between two events: The higher the CP utilization, the more requests are issued per unit of time.

In both model types, the leverage to manipulate a CP's utilization is its relative utilization during the time in which it is not waiting for a SH request to be resolved. This time is referred to herein as the CP's entry utilization $\chi$. Then, the total utilization $\mu$ is a workload dependent and system dependent function of $\chi$, $\mu=\mu(\chi)$ As mentioned above, $\mu$ includes CP wait times and hence is unknown, and the underlying utilization modeling problem consists in choosing $\chi$ such that $\mu=\mu(\chi)$ converges against the utilization aimed at. This utilization quantity is referred to herein as the target utilization u.

As mentioned before, prior art computer simulation models often ignore CP utilization completely. If, however, such prior art involves the predetermined setting of CP utilization, the most obvious approach to make $\mu$ converge against u is the so-called regulation technique.

Said prior art regulation techniques use the following iterative approach which consists of:
a) defining a start value for the entry control quantity,
b) performing a current run of simulation with this start value, thus yielding a resulting value for the target control quantity,
c) comparing the resulting target quantity to its value aimed at,
d) defining a new starting value in dependence of the existing result, and
e) performing a next run of simulation with this new starting value.

Of course, instead of being 1-dimensional, the starting value as well as the control quantity can be a multi-dimensional vector reflecting the multiple dimensions in a simulation system.

In prior art, the algorithm to choose the entry utilization works as follows: Starting with some entry value $\chi=\chi'_1$, the simulation model runs for a while, then determines the simulated total utilization $u_1$ and chooses a new value for $\chi$ to be selected for the next iteration of the simulation run: If $u_1<u$, then $\chi'_2>\chi'_1$ is chosen and vice versa. $\chi$ denotes the instantaneous value of $\chi$ valid for the next iteration. The quality and speed of convergence depend on the step-sizes chosen for the difference between $\chi'_2$ and $\chi'_1$ and on the initial value chosen for $\chi$ and may even vary with the value of the target utilization u. In particular, this heuristical method is exposed to over-correct $\chi$ and hence may lead to an undesired wide oscillation of the simulated utilization around u.

Disadvantageously, prior art provided feedback control algorithms may even become complex, as soon as the convergence history is used to determine the starting value of $\chi$ for the next iteration of the simulation run. Thus, the drawback of prior art is that:
a) it converges too slowly, which implies long-lasting simulation runs,
b) it is exposed to an undesired oscillation around the target utilization.

BRIEF SUMMARY OF THE INVENTION

It is thus an objective of the present invention to provide a method and system which:
a) saves computational time in computer simulations working according to the above sequence principle b} avoids wide oscillation around the target value of utilization.

In contrast to prior art algorithms as described above, the inventive algorithm uses one closed formula which was discovered within the present invention to choose the next instantaneous value $\chi'$ for the entry control quantity $\chi$. This value applies advantageously unchanged to any target control quantity u, like the before-mentioned target utilization, implies excellent convergence of u, and implicitly regards the convergence history.

Thus, according to its basic aspect, a computer-program-based method for providing a feedback control for a given set of entry and target control quantities $\chi$ and u of a system model is disclosed, the method comprising a repetition of the following steps:

a) providing a starting value $\chi'_1$ for each of the said entry control quantities $\chi$ in the model, b) running the model based on said starting values and obtaining a resulting actual value for each of said target control quantities u, c) using the values obtained for u to define a new start value for $\chi$ for use in a repeated modeling step, whereby the method is characterized by comprising the following formula to calculate the respective next value of the entry control quantities:

$$\chi'_{n+1} = \frac{v_n}{1 + \rho_n(1 - v_n)} \quad (6a)$$

where $\rho_n$ is a suitable parameter and $$v_n = (n+1)u - nu_n \quad (6b)$$

$\chi'_n$ is valid for the next iteration only while $u_n$ and $\rho_n$ are values measured from the beginning of the simulation.

Instead of being given directly, the starting value or starting vector $\chi$ may also be provided by derivation from other setting quantities $\chi$ is dependent from, if such alternative setting means are available in the system.

When said control quantities are CP utilizations in computer system models simulating multi-processor systems, then significant simulation time can be saved, and bring-up costs and bring-up time for new-developed computer hardware can be significantly reduced.

Therefore, the inventive method and its cost and time savings are of significant interest to any computer manufacturer building large scale multi-processor systems. Beyond the field of computer system simulations, the inventive algorithm disclosed also applies to and is beneficial to any field of technical simulations where a single simulation run consumes a considerable amount of time which is desired to be shortened.

However, its applicability is not restricted to simulation models. The inventive method may also be used to control any real production process, provided the process has the following characteristics:

first, the long term utilization of the processing machine must not exceed a certain limit (maybe in order to avoid burning out of temperature-sensitive parts), second, every once and a while, the work piece must be taken out of the main production stream for side processing (such as for heating up) before main processing can continue, third, the duration of the side process is not predictable, such as, when several main production lines compete for only one side processing facility, and, finally, the main processing system may not be turned off during side processing, because the work piece must be further processed immediately when it returns to the main production line.

In that case, in order to keep the main processing system's long term utilization below the given limit, but as well near to that limit, the system must be turned off for a certain amount of time every once and a while. As a skilled person may appreciate, this situation is equivalent to the CP utilization problem in an instruction driven multi-processor simulation model as described above. Examples in the above sense are steel and rolling mills, or in particular biochemical production processes.

BRIEF DESCRIPTION OF THE SEVERAL VIEWS OF THE DRAWING

These and other objects will be apparent to one skilled in the art from the following detailed description of the invention taken in conjunction with the accompanying drawings in which.

DETAILED DESCRIPTION OF THE INVENTION

Figure 1:
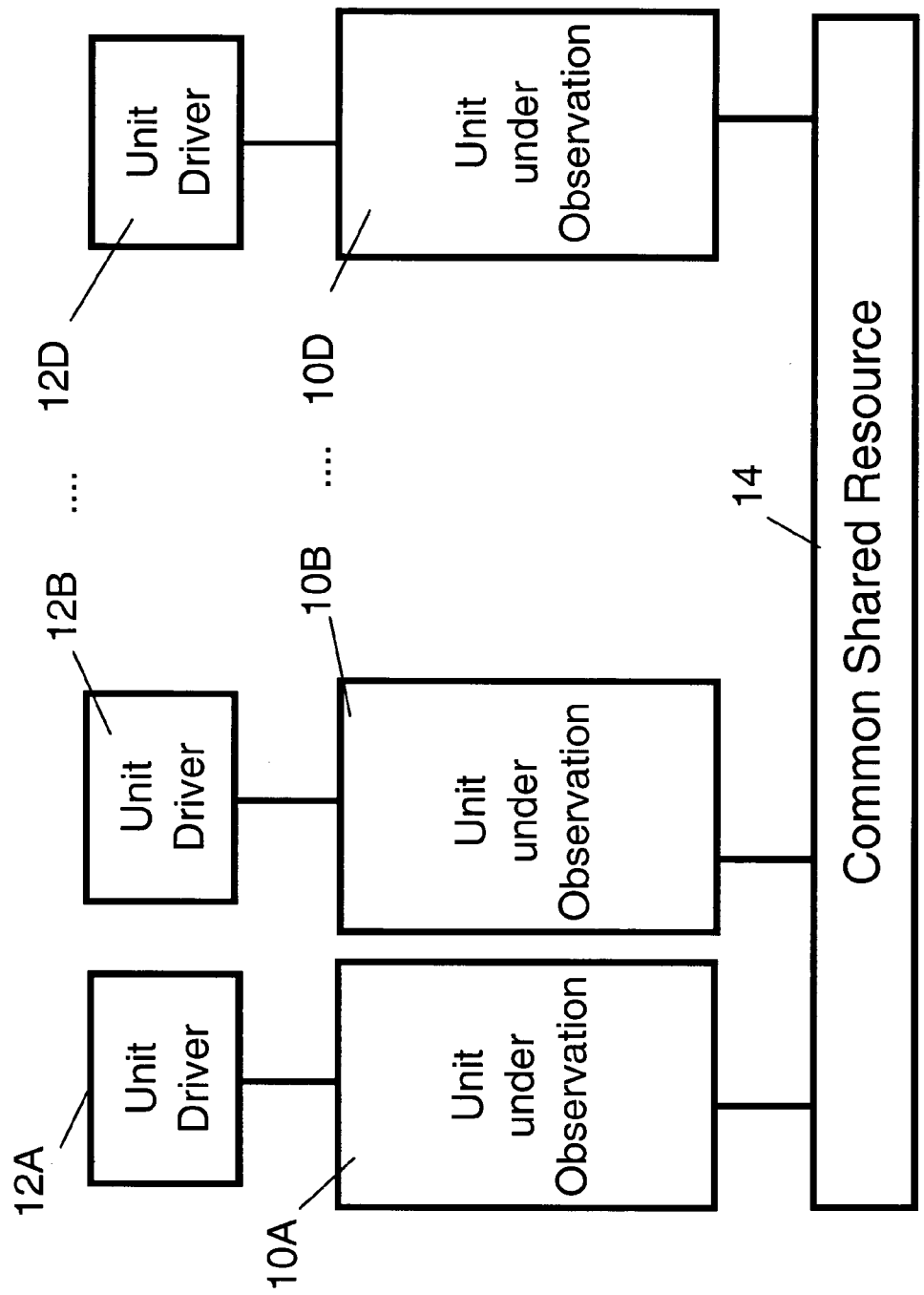
FIG. 1 is a schematic block diagram representation of a system under observation and simulation, to which the inventive approach applies.

The inventive method is described in more detail by way of example applied to computer system simulation models.

The following time and utilization variables are used:

Total run time T is the sum of system idle time I, instruction processing time P and system wait time W:

$$T = I + P + W. \quad (1)$$

During P, the system is assumed to process instructions at infinite cache speed. W is the total time a CP is delayed waiting for a storage hierarchy (SH) request to be resolved. Then, total CP utilization at time T is $$u_T = (P+W)/T, \quad (2)$$

and the "entry control quantity", i.e., the CP's entry utilization—i.e., its relative utilization during P—becomes $$x_T = P/(P+I). \quad (3)$$

Where $\rho_T = W/P$, or equivalently $$x_T = \frac{u_T}{1 + \rho_T(1 - u_T)}. \quad (5)$$

The feedback-process implemented according to this preferred embodiment adjusts $\chi$ every $\Delta$ cycles in such a way that the actual CP utilization approaches the target utilization aimed at, which is referred to as "target control quantity".

In the following formulas, u denotes the target utilization finally aimed at, $\Delta_n = [T_{n-1}, T_n]$, with $T_n = n\Delta$ is the n-th interval of observation time, $I'_n$, $P'_n$ and $W'_n$ denote the idle, processing and wait time within $\Delta_n$, $I_n$, $P_n$ and $W_n$ the respective accumulative times up to $T_n$, $u'_n$ and $\chi'_n$ denote the instantaneous total and entry utilization within $\Delta_n$, and $u_n$ and $\chi_n$ the respective accumulative utilizations up to $T_n$.

Relying on formula (5), all information available at time $T_n$ is used to choose the next value for the entry utilization. Thus, the inventive key regulation formula reads:

$$x'_{n+1} = \frac{v_n}{1 + \rho_n(1 - v_n)} \quad (6a)$$

where $\rho_n = W_n/P_n$ and $$v_n = (n+1)u - nu_n \quad (6b)$$

Since $u_n$ aims to approach u, the simple choice $$x'_{n+1} = \frac{u}{1 + \rho_n(1 - u)} \quad (7)$$

also makes CP utilization converge against u—slower, however, than with formula (6a, 6b).

The inventive embodiment of the feedback process is disclosed as follows:

Assuming $W_1 = P_1$ or $\rho_1 = 1$, the iteration starts with the entry utilization $\chi'_1 = \chi_1 = u/(2-u)$, where u is the target utilization.

In a rate driven model, this determines the request rate during non-wait time in $\Delta_1 = [T_0, T_1]$. In a model driven by instruction traces, it determines the user think time—i.e. the length of idle periods to be inserted into the instruction stream within $\Delta_1$.

During $\Delta_1$, the model records the simulated wait time $W'_1 = W_1$ and at time $T_1$, $P'_1 = P_1$ and $\rho_1 = W_1/P_1$ are deduced from formulas (1) $\Delta - W'_1 = P'_1 + I'_1$ and (3) $\chi'_1 = P'_1/(P'_1 + I'_1)$.

From (2), $u_1 = (P_1 + W_1)/T_1$ is calculated, and formula (6) is applied to arrive at the entry utilization $\chi'_2$ to be used in $\Delta_2 = [T_1, T_2]$.

During $\Delta_2$, the model records the simulated wait time $W'_2$, and at time $T_1$ similarly like before at time $T_1$, $P'_2$ and hence $P_2 = P_1 + P'_2$, $W_2 = W_1 + W'_2$ and $\rho_2 = W_2/P_2$ are deduced from formulas (1) $\Delta - W'_2 = P'_2 + I'_2$ and (3) $\chi'_2 = P'_2/(P'_2 + I'_2)$.

Then from (2), $u_2 = (P_2 + W_2)/T_2$ is calculated and the procedure can be iterated as often as required by any finish-criterion.

The following reasoning is added in here, in order to make the formula easier to understand:

The instantaneous version of formula (5) valid within $\Delta_n$ reads $$x'_n = \frac{u'_n}{1 + \rho'_n(1 - u'_n)} \quad (8)$$

Since obviously $$u'_n = nu_n - (n-1)u_{n-1} \quad (9)$$

(8) turns into (6), if $u_{n+1}$ is assumed to be sufficiently close to u and hence $\rho'_{n+1}$ close to $\rho_n$.

Further, formula (5) suggests that the accumulated entry utilization at time $T_{n+1}$ will be close to $$x_{n+1} = \frac{u}{1 + \rho_n(1 - u)} \quad (10)$$

This is equivalent to the iterative formula $$x_{n+1} = \frac{x_n}{1 + d_n(1 + \rho_n x_n)} \quad (11)$$

where $d_n = (u_n - u)/u$.

From (11), it follows that $\chi_{n+1} \leq \chi_n$ and hence $u_{n+1} \leq u_n$ if $u_n \geq u$ and vice versa. This guarantees that $\{u_n\}$ in fact converges against the target CP utilization u or at least oscillates sufficiently close around u.

With general reference to the figures and with special reference now to FIG. 1 the considerably large field of use for the inventive algorithm is intended to be illustrated. The actual core of the present invention is the formula (6a, 6b) given above.

This formula can be used according to the present invention in any technical application that uses a feedback mechanism to control a system of working units 10A, 10B, . . . , 10D which are switched in parallel and which access a common resource 14. Each of said units may produce an output of material or immaterial nature. Examples are working pieces treated in such units 10, like for example a car in the car producing industry, or an electrical current as an example for an immaterial output.

Each of said units 10 is controlled by an associated driver unit 12A, 12B, . . . , 12D. Without restricting the generality of the present invention, a single driver unit 12 may also control more than one of the working units 10.

Each working unit 10 is connected to said common, shared resource 14. The individual workload capacity of each unit depends on the degree up to which said common shared resource 14 is loaded.

When said common resource 14 performs poorly, the throughput of the working units 10 can be impacted severely. The inventive algorithm is intended to control the activity or load factor of each of the working units 10 in such a way that the shared resource 14 is in an operational status which is basically non-blocking. The reason, why an overload of the common shared resource 14 may result in a blocking of this system component will, of course, vary according to the applied field of use. A central feature of the system is the interdependency between the working units:

The throughput of each individual working unit 10 depends on the load of the other working units 10.

Figure 2:
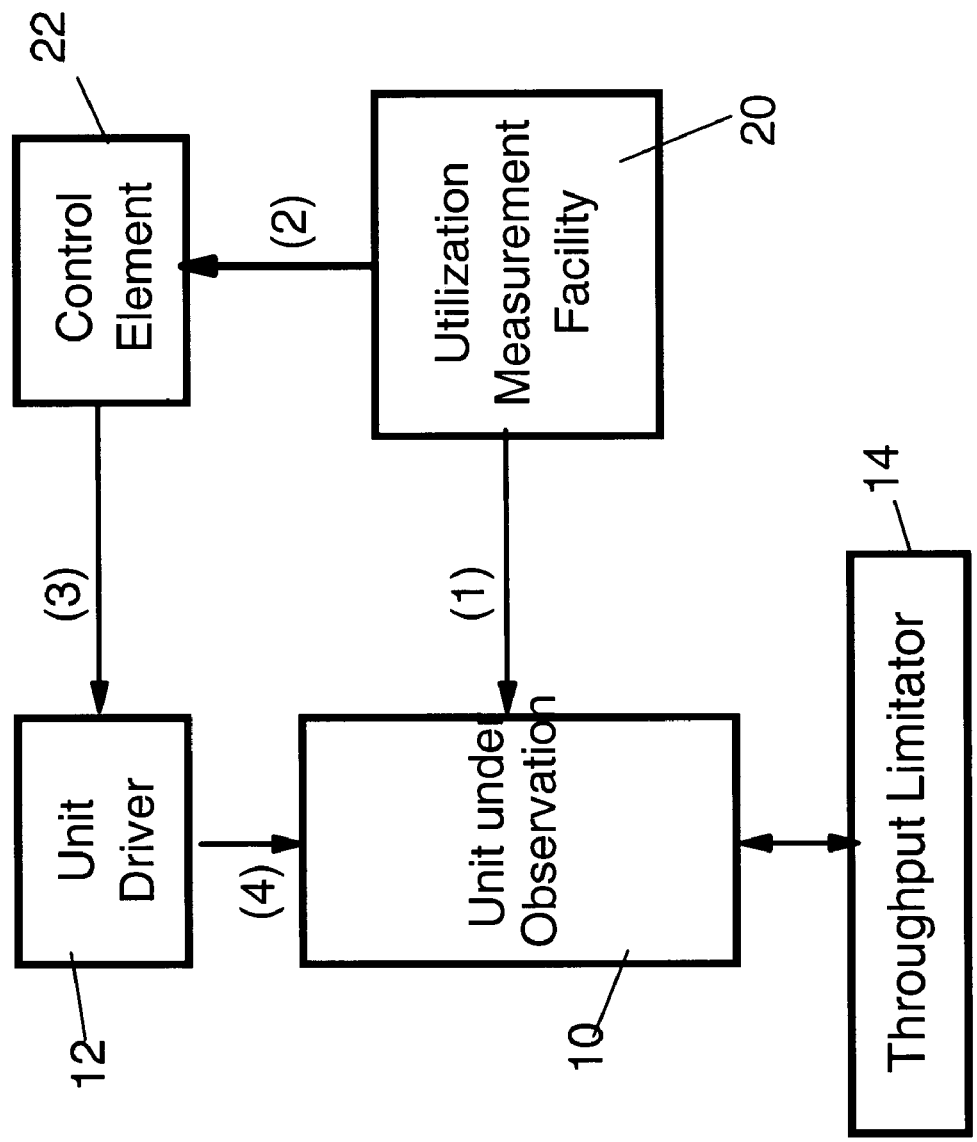
FIG. 2 is a schematic block diagram representation illustrating the functioning of the inventive control mechanism when applied to a plurality of transportation or processing units the throughput of which is dependent on external parameters.

FIG. 2 illustrates a more general exploitation of the inventive control mechanism. It applies to any transportation, mailing or processing units whose throughput depends on parameters outside to the unit itself. Again, the respective unit under observation is depicted with reference sign 10. It is driven by some driver unit 12. Its throughput is limited by some throughput limitation 14 which may vary from case to case.

The inventive mechanism presented is used to keep the throughput of the working unit 10 within a given tolerance band of for example +−2% around a given required throughput of e.g. 90% of the theoretically maximum throughput.

Thus, the working units' throughput is the target control quantity u in the sense of the appended claims. The throughput is synonymously denoted with a more generalized term of 'utilization' of the working unit 10. The load imposed by the driver unit is the working unit's entry utilization $\chi'$.

According to the generalized approach, a utilization measurement facility 20 measures the actual utilization $u_n$ of the working unit 10 by means of a predetermined scanning scheme and reports the measured utilization values to a control element 22. Measurement and report frequency may vary according to any physical requirements present in the respective application case.

The control element 22 stores a predetermined value of target utilization u associated with the working unit 10. The control element 22 processes the measured actual utilization $u_n$ by means of the inventive formula (6a, 6b) and calculates a new entry utilization $\chi'_{n+1}$ which the driver unit 12 uses to drive the working unit 10 until the next utilization measurement is performed. Thus, a closed loop control is implemented, involving the inventive formula.

The loop connects two subsequent observation periods by providing a new start value for the entry utilization of the working unit 10. By means of the inventive formula, the new entry utilization is calculated from the current utilization of the working unit 10, which has just been measured.

In FIG. 2, only one working unit 10, driver unit 12 and utilization measurement facility 20 are depicted. It shall be understood, however, that multiple copies of these devices may co-exist. The input from each of the respective utilization measurement facilities 20 can than be fed into one common, single control element, which performs the above-mentioned calculations and which in turn provides a new starting value to each of said driver units 12. Thus, as can be appreciated by a person skilled in the art, any prior art closed loop feedback control can take profit from the inventive algorithm. The advantage that results depends on the actual technical area in use. When, for example, the system is a complex simulation model, the technical effect associated with the present invention is to save computation time. When, however, the technical effect produced by the present invention is to provide for a very fast converging behavior, i.e. when by virtue of the present invention, the target control quantity such as the throughput of the working unit can be controlled such that some required value is quickly reached in practice, then, any individual physical technical effect and advantage can be achieved, the nature of which varies from the applicational field, again. When, for example the watermark of a system of rivers shall be controlled by the inventive approach, it is very important to avoid peaks of the control quantity (watermark) because both, a positive and a negative excess of the tolerated tolerance band may have severe effects on the ships being present on the rivers, or for inhabitants and infrastructure of the river's embedding landscape.

Figure 3:
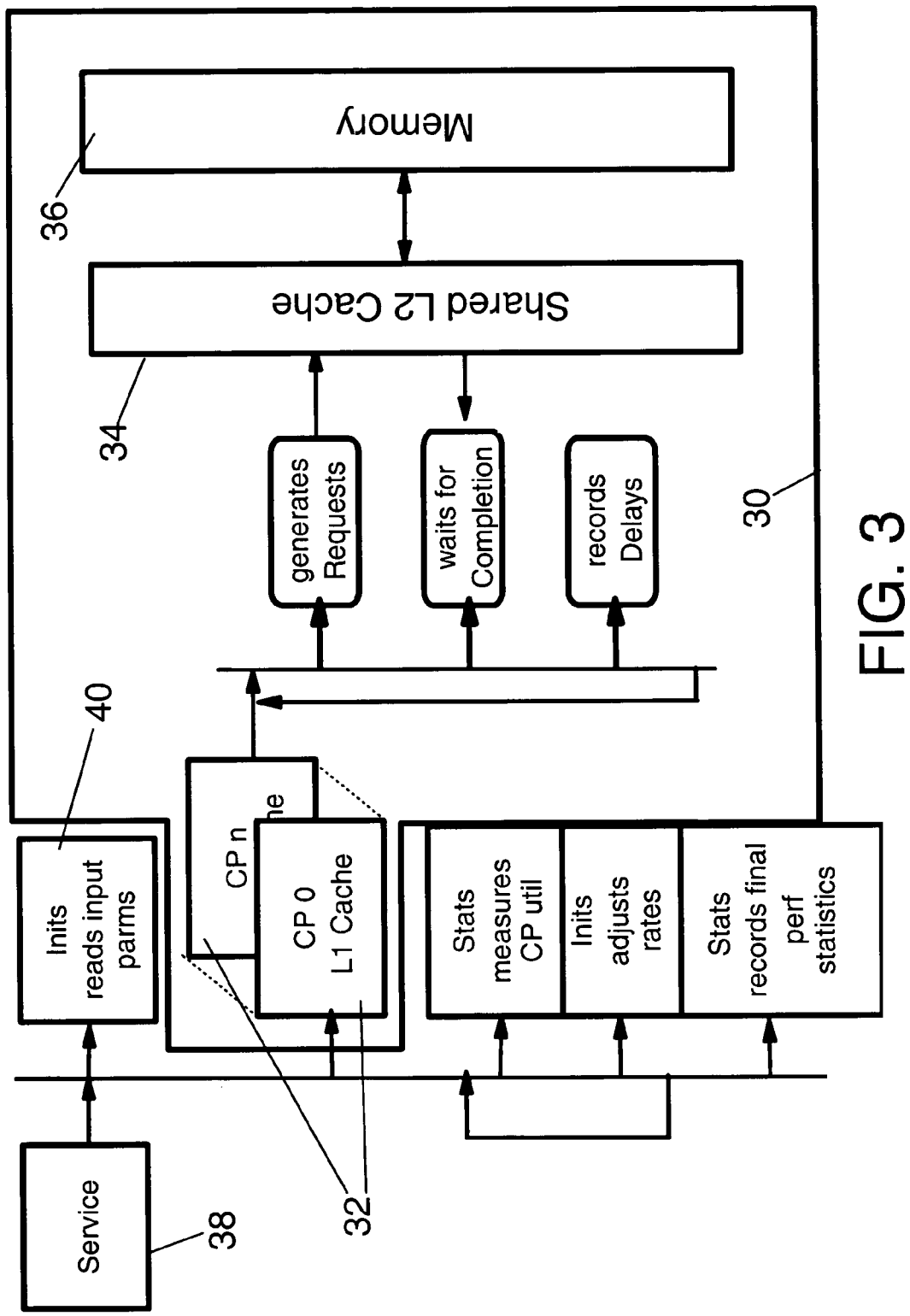
FIG. 3 is a schematic block diagram representation illustrating a multi-processor performance model which is controlled and improved by the inventive method.
Figure 4:
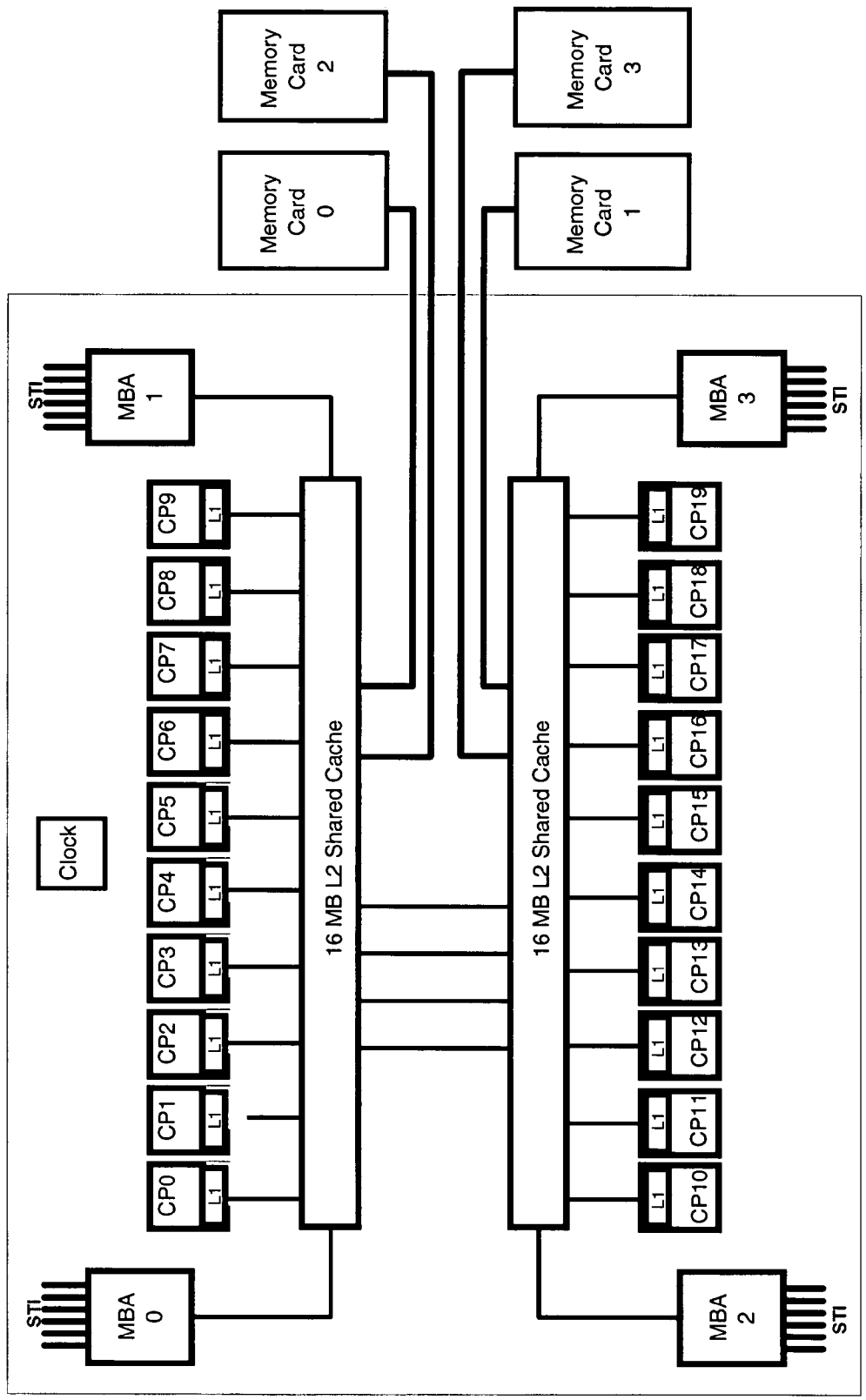
FIG. 4 is a schematic block diagram representation illustrating the system structure of the IBM eServer zSeries 900 server as an example for a real large scale multi-processor system which can underlie the model structure shown in FIG. 3.

FIG. 3 illustrates a preferred implementation of the inventive approach in a multi-processor performance model. As an example for a possibly underlying real computer system, FIG. 4 depicts the structure of the IBM zSeries 900 server.

In FIG. 3, the system under observation is the box with reference sign 30. It corresponds to the total of FIG. 1. Its major hardware components are a given number of processors, each including a level 1 cache (L1-cache), depicted with reference sign 32, a common shared level 2 cache 34 (L2-cache), and a common shared main memory 36.

The processors 32 are both working units and unit drivers. They generate requests to the L2-cache 34 and wait until the preceding request is complete before a new request is launched. In the schematic model depicted in FIG. 3, a statistical number generator is used to determine the time at which the next request to the L2-cache 34 is issued. Alternatively, in trace driven models, a trace reader working on an instruction trace would be used instead of the statistical number generator.

According to the preferred embodiment given in here, the time each processor 32 spends waiting for a request to complete is recorded in a table. Together with the processor's entry utilization, this wait time determines the actual load $u_T$ of each processor 32 at any time T. As detailed above, an accurate simulation of the CP utilization is key for a high quality performance model.

The control elements of the model are shown outside box 30.

The highest priority control element depicted with reference sign 38 is a module called service. When starting a simulation run, the service module 38 invokes an initialization routine 40 which provides all parameters describing the system configuration and the workload to be modeled. In particular, the initialization routine reads all the request rates and the desired target utilizations of the processors from input files associated with the workload to be modeled.

With regard to the target utilization u, a first entry utilization $\chi'_1$ is selected in a plausible way. From $\chi'_1$ and from the request rates read-in before, the mean time $\tau = \tau_1$ between any two requests is determined. Said mean time is referred to herein as interarrival time.

Next, the service module 38 starts as many instances of the processor modules 32, as CPs are to be simulated. As mentioned above, the processor modules 32 generate storage hierarchy requests based on the actually valid interarrival time of requests and record their duration.

During all simulation time, the service module 38 remains in a program loop, which invokes the statistics and the initialization routine in predetermined time intervals. The statistics routine corresponds to the utilization measurement device depicted with reference 20 in FIG. 2.

Upon each call, said statistics routine calculates the actual total utilization $u_n$ of the processors 32 from their entry utilization $\chi'_n$ and the table-stored request wait time as described above in the introductive theoretical section. The initialization routine in turn uses the inventive formula (6a, 6b) to calculate the entry utilization $\chi'_{n+1}$ for the next observation period from $u_n$ and u. Finally, from the new value of the entry utilization, the mean interarrival time $\tau = \tau_{n+1}$ is re-calculated and used from now on by the processing units 32.

For improved clarity and as a supplemental inventive disclosure, the following section provides the pseudocode to the preferred embodiment of the invention illustrated by FIG. 3 and FIG. 4. For simplicity, the instantaneous entry utilization is denoted by y rather than $\chi'$:

```
Service                              /* main controller */
{
Inits(virgin = TRUE)                 /* initial initialization*/
Generate CP-Drivers 0, . . . ,m      /* MP system */
Loop here for run_time
{
Advance Delta cycles                 /* observation period */
Stats(run_end = FALSE)               /* calculate utilization */
Inits(virgin = FALSE)                /* adjust entry util. */
}
Stats(run_end = TRUE)                /* final run statistics */
}
Inits(virgin)                        /* Initializations */
{
If virgin {                          /* on run start */
Read input parms
specifically request rates r
and aimed-at utilization u
Make guess on entry_util y = y.1    /* initial entry util */
} Else {                             /* each observ period */
                                     /* use algorithm */
Calculate entry_util y = y.n = y(u.n,u)
                                     /* u.n from stats */
}
Calculate interarrival time Tau = Tau(y,r) of requests
}
CP Driver                            /* m = MP instances */
{
Loop here for run_time
{
Determine time to next request:      /* typically: */
t = Distribution(Tau)                /* Exponential distrib*/
Advance t cycles                     /* to next request */
Launch request
Wait until request_done
Record wait time w                   /* for stats */
}
}
Stats (run_end)                      /* Statistics */
{
If (not run_end) {                   /* each observ period */
                                     /* w recorded by CP */
Calculate actual utilization u.n = u(w,y.n)
                                     /* y = entry util */
} Else {                             /* run complete */
Evaluate and report performance statistics
}
   }
```

Figure 5:
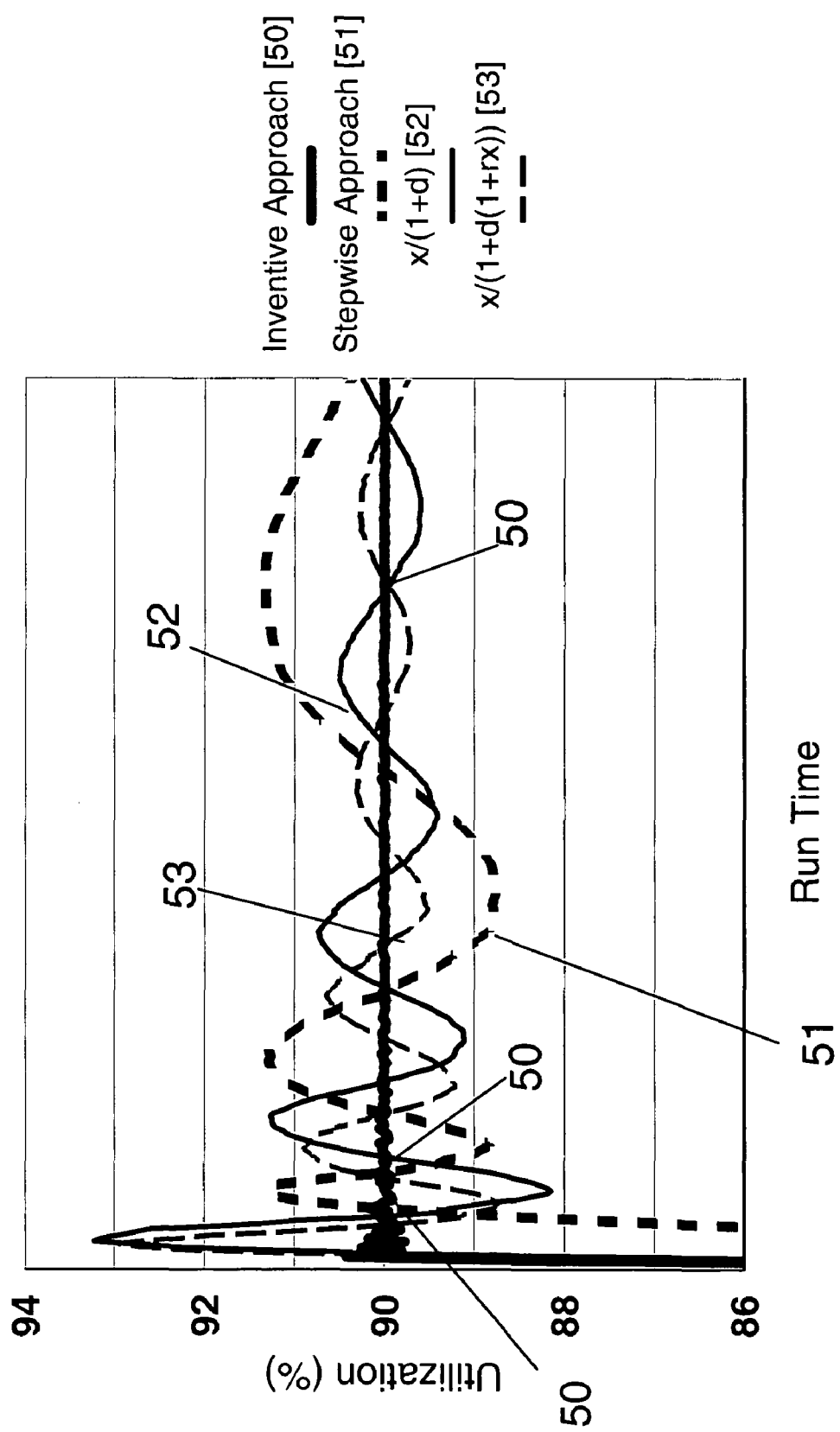
FIG. 5 is a chart showing CP utilization over runtime illustrating the efficiency of the inventive feedback algorithm when compared to prior art control methods.

FIG. 5 illustrates the efficiency and advantages of the inventive method by comparing its convergence behavior to prior art methods.

The first prior art method is the stepwise approach, the curve of which is depicted with reference sign 51: The instantaneous entry utilization gets adjusted by a fixed value d, that is $\chi'_{n+1} = \chi'_n + d$, which changes its sign and gets divided by 2 as soon as the utilization crosses the utilization aimed at: $d \to d/2$. This is the approach with the poorest convergence among the alternatives shown.

Better convergence is achieved with further approaches depicted by the graphs with reference signs 52 and 53: Instead of the fixed value d used in method 51, they use the actual deviation from target utilization $d_n = (u_n - u)/u$ to adjust entry utilization. Two approaches are shown herein.

The straightforward approach $\chi'_{n+1} = \chi'_n/(1+d)$ is a second prior art method depicted by reference sign 52. A choice with noticeably better convergence exploits the instantaneous version of formula (11) which reads $\chi'_{n+1} = \chi'_n/(1+d_n(1+\rho'_n\chi'_n))$. This is an inventive embodiment of the general inventive formula (6a, 6b). Its graph is depicted with reference sign 53.

By far best performing is the approach which directly uses the inventive formula (6a, 6b). It is depicted with reference sign 50. Excellent convergence is reached at a time where prior art curves still show unacceptable high fluctuation.

The present invention can be realized in hardware, software, or a combination of hardware and software. A tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following:

a) conversion to another language, code or notation;
b) reproduction in a different material form.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A computer-program-based method for providing a feedback control for a given set of entry and target control quantities $\chi$ and u of a system model where $\chi$ is an entry utilization value and u is a target utilization value, the method comprising a repetition of the following steps:

a) providing a time-dependent simulation system model of a system in a computer memory for simulating performance of real hardware for a number n of iterations;
   b) providing a predetermined starting utilization value $\chi'_1$ for each of said entry utilization control quantities $\chi$ in said model,
   c) running the model based on said starting values and obtaining a resulting actual utilization value for each of said target utilization control quantities u,
   d) using the values obtained for u to define a new start value for $\chi$ for use in a repeated modeling step,
   e) storing in said computer memory for display, at least the value of $\chi$ for the last iteration,
   whereby the system method comprises the following formula to calculate the respective next value of the entry utilization control quantities:

$$\chi'_{n+1} = \frac{v_n}{1 + \rho_n(1 - v_n)}$$

where $\rho_n$ is an accumulated wait time divided by an accumulated processing time of the system and v is a value according to the formula:

$$v_n = (n+1)u - nu_n$$

$\chi'_n$ being valid for the next iteration only while $u_n$ and $\rho_n$ are values measured from the beginning of the simulation and, f) simulating a multi-processor system in which said utilization control quantities $\chi$ and u are central processor utilizations in a computer system model wherein utilization is the percentage of time the central processor utilizes for processing.

2. A computer program product for providing a feedback control for a given set of entry and target control quantities $\chi$ and u of a system model where $\chi$ is an entry utilization value and u is a target utilization value, said computer program product comprising:

a computer readable medium having recorded thereon computer readable program code performing the method comprising a repetition of the following steps:

a) providing a timedependent simulation system model of a system in a computer memory for simulating performance of real hardware for a number n of iterations;

b) providing a predetermined starting utilization value $\chi'_1$ for each of said entry utilization control quantities $\chi$ in said model, c) running the model based on said starting values and obtaining a resulting actual utilization value for each of said target utilization control quantities u, d) using the values obtained for u to define a new start value for $\chi$ for use in a repeated modeling step, and e) storing in said computer memory for display, at least the value of $\chi$ for the last iteration, whereby the method comprises the following formula to calculate the respective next value of the entry utilization control quantities:

$$x'_{n+1} = \frac{v_n}{1 + \rho_n(1 - v_n)}$$

where $\rho_n$ is an accumulated wait time divided by an accumulated processing time of the system and $v$ is a value according to the formula:

$$v_n = (n+1)u - nu_n$$

$\chi'_n$ being valid for the next iteration only while $u_n$ and $\rho_n$ are values measured from the beginning of the simulation and, f) simulating a multi-processor system in which said utilization control quantities $\chi$ and u are central processor utilizations in a computer system model wherein utilization is the percentage of time the central processor utilizes for processing.

3. A computer system for providing a feedback control for a given set of entry and target control quantities $\chi$ and u of a system model where $\chi$ is an entry utilization value and u is a target utilization value, the computer system comprising:

a) a computer memory having a time-dependent simulation system model of a computer system for simulating performance of real hardware for a number n iterations;

b) a starting utilization value $\chi'_1$ for each of said entry utilization control quantities $\chi$ in said system model, c) a control element running the system model based on said starting utilization values and obtaining a resulting actual utilization value for each of said target control quantities u, d) said control element using the values obtained for u to define a new start value for $\chi$ for use in a repeated modeling step, and e) storing in said memory for display, the value of $\chi$ for the last iteration, whereby the control element uses the following formula to calculate the respective next value of the entry utilization control quantities:

$$x'_{n+1} = \frac{v_n}{1 + \rho_n(1 - v_n)}$$

where $\rho_n$ is an accumulated wait time divided by an accumulated processing time of the system and $v$ is a value according to the formula:

$$v_n = (n+1)u - nu_n$$

$\chi'_n$ being valid for the next iteration only while $u_n$ and $\rho_n$ are values measured from the beginning of the simulation and, f) simulating a multi-processor system in which said utilization control quantities $\chi$ and u are central processor utilizations in a computer system model wherein utilization is the percentage of time the central processor utilizes for processing.

* * * * *